US012155551B1

(12) United States Patent
Lamanna et al.

(10) Patent No.: US 12,155,551 B1
(45) Date of Patent: Nov. 26, 2024

(54) NETWORK MONITORING WITH CORRELATION BETWEEN USER NETWORK SEGMENTS AND CLOUD PROVIDER RESOURCES

(71) Applicant: Amazon Technologies, Inc., Seattle, WA (US)

(72) Inventors: James Michael Lamanna, Seattle, WA (US); Benjamin Cory Schulz, Minnetonka, MN (US); Douglas Viana Esanbock, Minneapolis, MN (US); Vamsee Kasavajhala, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 17/694,344

(22) Filed: Mar. 14, 2022

(51) Int. Cl.
*H04L 41/0631* (2022.01)
*H04L 12/26* (2006.01)
*H04L 29/08* (2006.01)
*H04L 43/0829* (2022.01)
*H04L 43/0852* (2022.01)
*H04L 43/12* (2022.01)

(52) U.S. Cl.
CPC .......... *H04L 43/12* (2013.01); *H04L 43/0829* (2013.01); *H04L 43/0852* (2013.01)

(58) Field of Classification Search
CPC .. H04L 43/12; H04L 43/0829; H04L 43/0852
See application file for complete search history.

(56) References Cited

U.S. PATENT DOCUMENTS

| | | | |
|---|---|---|---|
| 10,462,015 B1* | 10/2019 | Henry | H04L 43/50 |
| 2021/0051088 A1* | 2/2021 | Kovari | H04L 43/062 |
| 2022/0150153 A1* | 5/2022 | Clancy | H04L 43/0852 |
| 2022/0239578 A1* | 7/2022 | Raleigh | H04L 43/026 |
| 2022/0247651 A1* | 8/2022 | Kerpez | H04L 43/065 |
| 2022/0272001 A1* | 8/2022 | Mayor | H04L 41/0631 |
| 2022/0321408 A1* | 10/2022 | Mahimkar | H04L 41/0886 |

* cited by examiner

*Primary Examiner* — Schquita D Goodwin
(74) *Attorney, Agent, or Firm* — Klarquist Sparkman, LLP

(57) ABSTRACT

A monitoring service transmits network packets from a user's source network segment to a user-defined endpoint upon request from a user. The endpoint can be any valid private IP address or DNS name where traffic is to be sent. Users can further define a monitor, which combines the endpoint, the subnets that the users want to send traffic from, and probes that define how packets are sent to the endpoint. Users can enable probe (IPv4 and IPv6) support, and probes can use ICMP or TCP protocols. Probes can be transmitted towards the configured endpoint from the source segments that are defined, and report metrics, such as packet loss and round-trip time or other measured latency. The metrics can be compared against health monitoring metrics to determine whether any issues are associated with a compute service provider, generally, or with a user network segment.

15 Claims, 8 Drawing Sheets

NETWORK MONITORING WITH CORRELATION BETWEEN USER NETWORK SEGMENTS AND CLOUD PROVIDER RESOURCES

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies, such as equal-cost multi-path (ECMP) routing, which is a strategy where next-hop packet forwarding to a destination can occur over multiple best paths.

Latency and packet loss are important metrics for testing of a network. Network operations and engineering teams use latency and packet loss determinations to identify and fix network performance problems. The latency experienced between a network source and a network destination is determined by the sum of link propagation latencies for the links on the network path between them, and the sum of the switching and queuing latencies at each router hop that interconnects those links. Networks are dynamic and as changes are made to the network topology and configuration, either by design or by failure, the paths used between a source and a destination can change. As traffic loads change, the queuing latencies at each hop change. As a result, it can be difficult to know what the expected network latencies should be between any source/destination pair. Packet loss occurs when a packet transmitted from a source host server computer is not reached by a destination computer. Packet loss can occur for multiple reasons, such as dropped packets due to an overloaded buffer on a network switch. For users that have private network segments operating within a cloud provider (also called a compute service provider), it is difficult to know whether any latency or packet loss problems are due to the cloud provider or the private network segments.

DETAILED DESCRIPTION

A monitoring service can be configured to transmit network packets from a user's source network segment to a user-defined endpoint upon request from a user. The endpoint can be any valid private Internet Protocol (IP) address or Domain Name System (DNS) name where traffic is to be sent. Users can further define a monitor, which combines the endpoint, the subnets that the users want to send traffic from, and probes that define how packets are sent to the endpoint. Users can enable probe (IPv4 and IPv6) support, and probes can use Internet Control Message Protocol (ICMP) or Transmission Control Protocol (TCP) protocols. Probes can be transmitted towards the configured endpoint from the source segments that are defined, and can report metrics, such as packet loss and round-trip time or other measured latency. The metrics can be compared against health monitoring metrics to determine whether any issues are associated with the compute service provider generally, or with a user network segment. A signal can then be transmitted to the user including information as to whether a problem is with a compute service provider or a user network.

Figure 1:
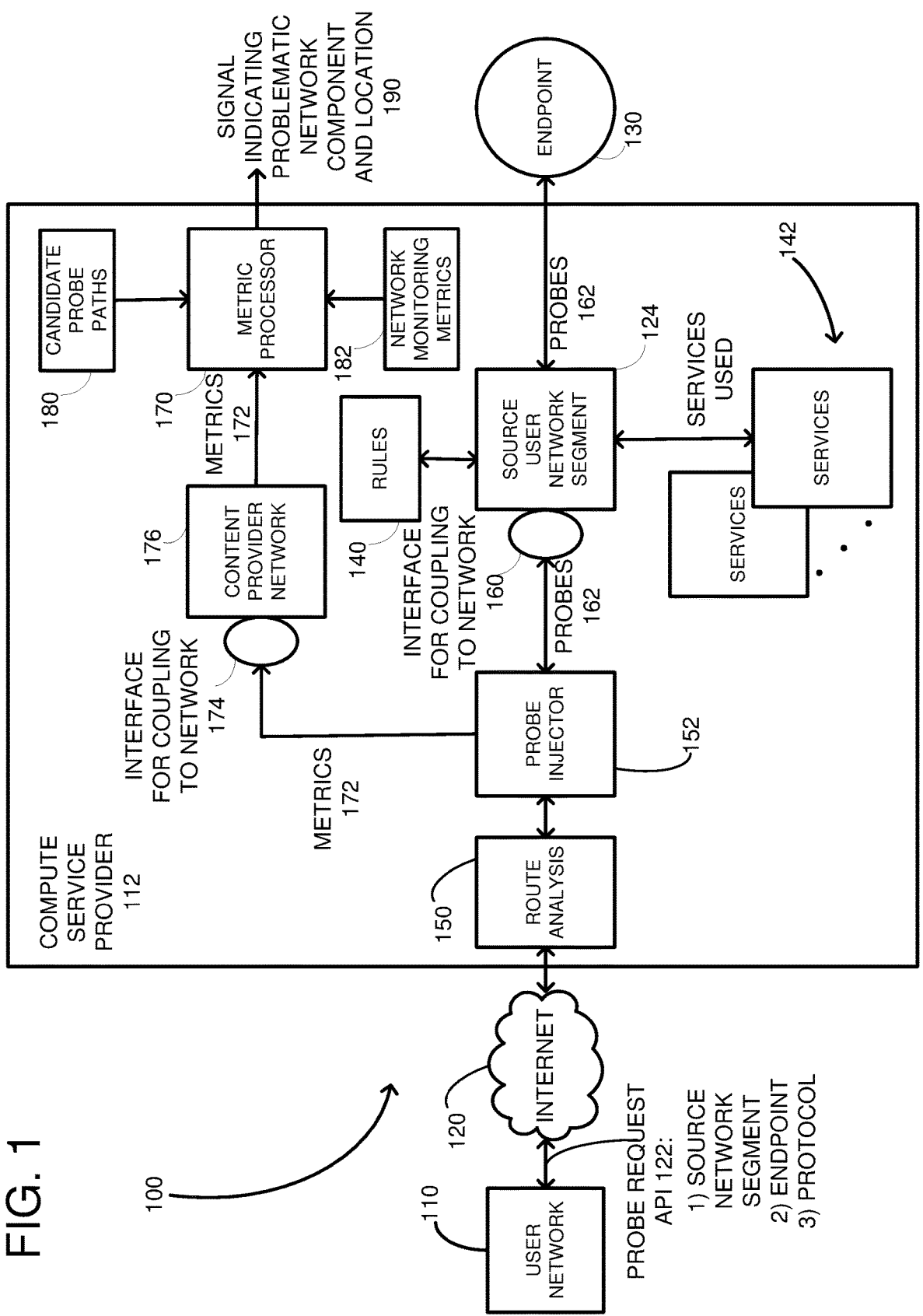
FIG. 1 is a system for monitoring a network by examining a correlation between user network segments and cloud provider resources.

FIG. 1 is an embodiment of a monitoring system 100 including a user network 110 and a compute service provider 112. The user network 110 can be coupled to the compute service provider (a cloud-computing provider) through an Internet 120 connection. A user operating on the user network can transmit a probe request API 122, which includes 3 or more parameters including a source network segment, an endpoint, and a protocol to use. The API can be received by the compute service provider 112 to perform a service. Services are commonly used in cloud computing. A service is a software function provided at a network address, such as over the Internet or another network. Clients initiate service requests to servers and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

The probe request API 122 includes the source network segment, which is a source network segment 124 within the compute service provider 112. The source network segment 124 allows the user to have control over a virtual network environment, including resource placement, connectivity, and security. Additionally, the source network segment 124 can have a range of IP addresses that are assigned to use by the source network segment. The probe request API 122 can also include an endpoint 130, which can be within the source user network segment 124 or external thereto. Additionally, the endpoint 130 can be within the compute service provider 112 or outside of the compute service provider. Typically, the endpoint 130 can be a server computer that can receive and return pings for the purposes of latency calculations. The probe request API 122 can further include a protocol. The protocol can be TCP, ICMP, Voice over IP (VOIP), Hypertext transfer protocol (HTTP), DNS, etc. The source user network segment 124 can be coupled to a rules database 140 that describes rules for packets to traverse the network segment 124. For example, the rules can include network packet rules that generally impose restrictions for network packets. Such rules can restrict inbound and outbound network traffic through specific ports of the selected data protocol, for example. The source user network segment 124 can include a plurality of networking components, including server computers, routers, and data storage. The server computers (not shown) of the user network segment 124 can run applications that use services 142 of the compute service provider 112.

The API request 122 can be received by the compute service provider 112 in a route analysis module 150, which analyzes the parameters of the API request and selects different candidate paths (static or dynamic) through the source user network segment 124 to arrive at the endpoint 130. For example, different subnets can be generated, such as follows:

Subnet A-Gateway 1-Gateway 2-Interface 1-endpoint
Subnet B-Gateway 3-Gateway 4-Interface 2-endpoint Although two subnets are shown, other subnets can be generated. One of the subnets (A) can be selected, such as by the user or by the route analysis module 150, and the selected route is communicated to a probe injector 152. The other subnet (B) can be reserved as a failover. The probe injector 152 can couple an interface 160 to the source user network segment 124. The interface 160 can be a logical networking component that represents a virtual network card. The interface 160 can include one or more of the following attributes: 1) A primary IPV4 address range; 2) One or more secondary address ranges; 3) one or more security groups; and 4) a MAC address. Other attributes can be added. The probe injector 152 can then transmit probes 162 through the source user network segment 124 using the interface 160. The probes 162 are required to follow the rules 140 of the source user network segment. As such, the probes 162 imitate actual network traffic through the source user network segment 124 towards the endpoint 130. Additionally, by analyzing metrics of probes that follow the rules 140, the routing policy associated with the rules can be verified. The endpoint 130 can be, for example, a server computer that receives the probes as ICMP pings and responds in accordance with the protocol.

The probe injector 152 can obtain packet loss and latency metrics (collectively shown as metrics 172, but other metrics can be included) using the probes 162 and submit the probes to a metric processor 170 for analysis. To transmit the metrics 172, the probe injector 152 establishes an interface 174 on a content provider network 176. The interface 174 can be similar to the interface 160, explained above. The metric processor 170, which can be on a server computer, can pull data from a database 180, which includes candidate paths through the source user network segment 124, which the probes 162 might have traversed. Additionally, the metric processor 170 can retrieve network monitoring metrics from a database 182, which is health monitoring metrics collected by the compute service provider 112, based on all network traffic through the compute service provider 112 (i.e., by multiple users). For metrics 172 that exceed predetermined thresholds (which can be set by a user of the user network 110), the metric processor 170 correlates those metrics with the network devices along the candidate paths 180 and determines if the network monitoring metrics 182 correlate with the metrics 172. For example, if a router that is in a candidate probe path (180) exceeds one of the metrics 172, then that router can be checked against the metrics 182 to determine if other user metrics were also exceeded. If so, then multiple user networks are experiencing the same problems, not only the source user network segment 124. As such, the metric processor 170 can determine that the problems are with the compute service provider 112, not the source user network segment. A similar analysis can be used for determining whether all users are experiencing issues with the services 142 or only the source user network segment. A signal 190 can be transmitted to the user network 110 such that a user can determine whether a problem is with their source user network segment 124 or the problem is with the compute service provider 112. In the case of the active path failing, a failover mechanism can be used and the traffic switched over to the alternative path of the candidate paths described above.

Figure 2:
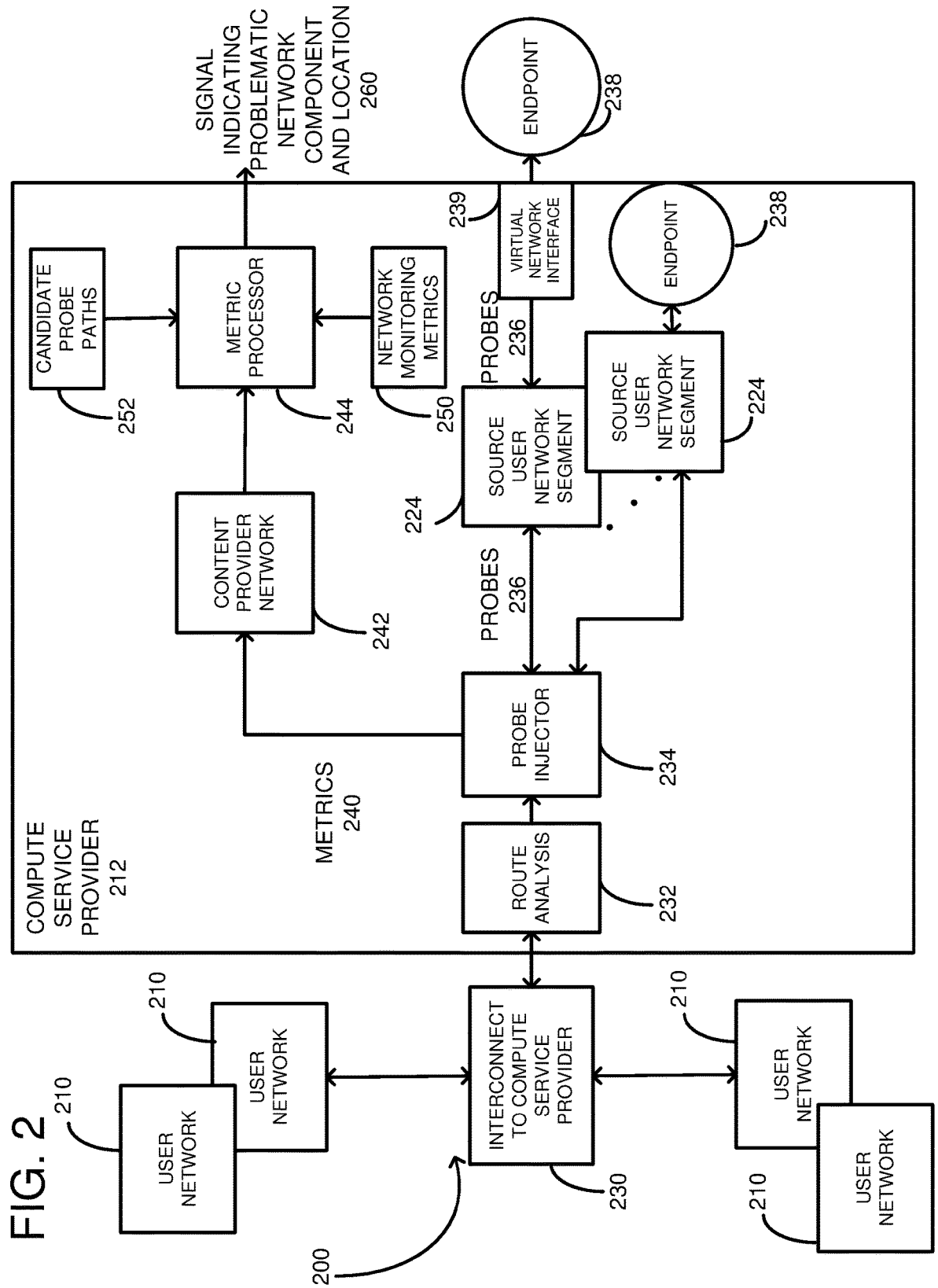
FIG. 2 is a system for monitoring a network wherein multiple user networks are coupled to a cloud provider through a interconnect.

FIG. 2 shows an embodiment of a monitoring system 200 including a plurality of different user networks 210 and a compute service provider 212. The different user networks 210 can be associated with different source user networks 224 within the compute service provider 212. Any number of source user network segments 224 can be provided as indicated by the repeating dots between the source user network segments. The user networks 210 can collectively be coupled to the compute service provider 212 through a interconnect 230. More specifically, the interconnect 230 can be coupled to the compute service provider 212 via a route analysis 232, which computes routes through the different source user network segments 224, as previously described. The interconnect can ensure be an edge networking device that the user networks 210 are coupled to so as to connect to the compute service provider 212 without traversing the Internet, which is less secure. The interconnect can be called an edge networking device because it is positioned adjacent to an edge of the compute service provider. A probe injector 234 can inject probes 236 through the appropriate source user network segment 224 in accordance with the requesting user network 210 to one of the endpoints 238, which can be external or internal to the compute service provider 212, as shown. The external endpoint can also require the probes to pass through a virtual network interface 239, which can be a transient gateway or a VPN tunnel. The external endpoint can also be positioned within the user network 210, which made the request. Such an injection can be associated with an API request (not shown) from a corresponding user network, similar to the API request of FIG. 1. The endpoints 238 can respond so that the probe injector 234 can collect metrics, such as latency and dropped packets, and transmit such metrics 240 through a content provider network 242 to a metric processor 244. The metric processor 244 can then determine if any of the source user network segments 224 have faulty network devices. If the user networks 210 are experiencing packet loss or latency issues and the source user network segments 224 are not to blame (based upon the collected metrics 240), then the metric processor 244 can determine that the shared interconnect 230 can be to blame. The metric processor can then inform the user networks 210 through a signal 260, which identifies whether the problem is associated with the compute service provider 212, generally, or through some other components not associated with the compute service provider, such as the interconnect.

Figure 3:
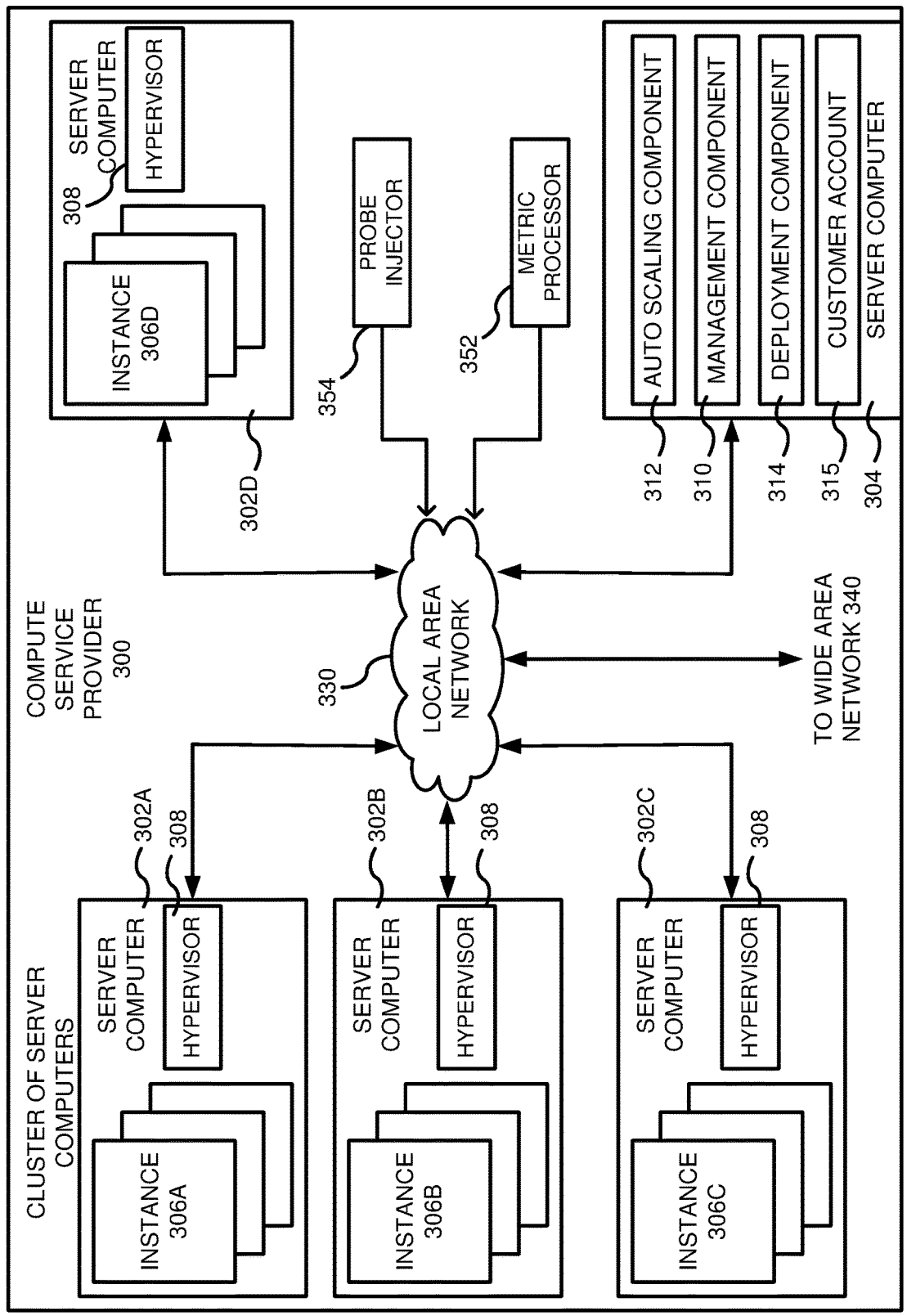
FIG. 3 is an example system diagram showing a plurality of virtual machine instances running in the multi-tenant environment.

FIG. 3 is a computing system diagram of a network-based compute service provider 300 that illustrates one environment in which embodiments described herein can be used. The compute service provider 300 is one embodiment giving further details of the compute service providers 112, 212, of FIGS. 1 and 2. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

In some implementations of the disclosed technology, the computer service provider 300 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e., a computer) that executes applications like a physical machine. In the example of virtual machine, each of the servers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, protocols used in the source user network segments, etc.

A network 330 can be utilized to interconnect the server computers 302A-302D and the server computer 304. The network 330 can be a local area network (LAN) and can be connected to a Wide Area Network (WAN) 340 so that end users can access the compute service provider 300. It should be appreciated that the network topology illustrated in FIG. 3 has been simplified and that many more networks and networking devices can be utilized to interconnect the various computing systems disclosed herein.

A metric processor 352 can execute on a server computer and can operate similar to the metric processors of FIGS. 1 and 2. Software associated with the metric processor can likewise execute on one of the instances 306. The metric processor 352 can obtain metrics from various sources, as described above, and make determinations relating to which network resources in the system are problematic. A probe injector 354 can also execute on a server computer and can execute on one or more of the instances 306. The probe injector 354 can be similar to the probe injectors of FIGS. 1 and 2, and can inject probes towards an endpoint. The instances 306 can also operate as endpoints, which receive the probes and transmit the probes back to the probe injector for latency and packet loss determinations.

Figure 4:
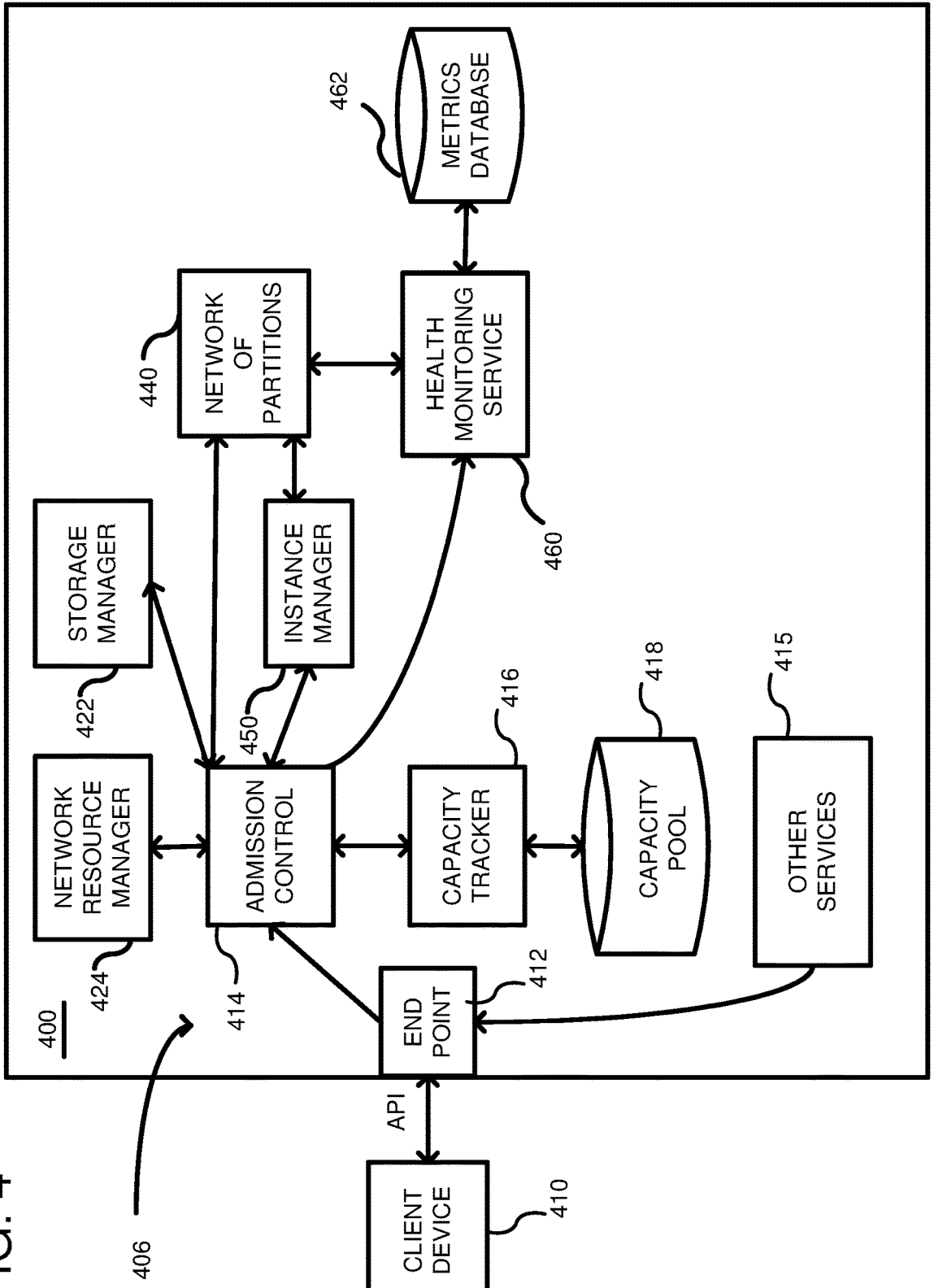
FIG. 4 shows further details of an example system including a plurality of management components associated with a control plane.

FIG. 4 illustrates in further detail management components 406 that can be used in the multi-tenant environment of the compute service provider 400. In order to access and utilize instances (such as instances 306 of FIG. 3), a client device can be used. The client device 410 can be any of a variety of computing devices, mobile or otherwise including a cell phone, smartphone, handheld computer, Personal Digital Assistant (PDA), desktop computer, etc. The client device 410 can communicate with the compute service provider 400 through an end point 412, which can be a DNS address designed to receive and process API requests. The client device 410 can be associated with a user network such as 110 from FIG. 1 or 210 from FIG. 2. In particular, the end point 412 can be a web server configured to expose an API. Using the API requests, a client 410 can make requests to implement any of the functionality described herein. Other services 415, which can be internal to the compute service provider 400, can likewise make API requests to the end point 412.

Other general management services that may or may not be included in the compute service provider 400 include an admission control 414, e.g., one or more computers operating together as an admission control service. The admission control 414 can authenticate, validate and unpack the API requests for service or storage of data within the compute service provider 400. The capacity tracker 416 is responsible for determining how the servers need to be configured in order to meet the need for the different instance types by managing and configuring physical inventory in terms of forecasting, provisioning and real-time configuration and allocation of capacity. The capacity tracker 416 maintains a pool of available inventory in a capacity pool database 418. The capacity tracker 416 can also monitor capacity levels so as to know whether resources are readily available or limited. An instance manager 450 controls launching and termination of instances in the network. When an instruction is received (such as through an API request) to launch an instance, the instance manager pulls resources from the capacity pool 418 and launches the instance on a decided upon host server computer. Similar to the instance manager are the storage manager 422 and the network resource manager 424. The storage manager 422 relates to initiation and termination of storage volumes, while the network resource manager 424 relates to initiation and termination of routers, switches, subnets, etc. A network of partitions 440 is described further in relation to FIG. 5 and includes a physical layer upon which the instances are launched.

A health monitoring service 460 can provide monitoring for resources and the applications users run on the compute service provider 400. System administrators can use the monitoring service 460 to collect and track metrics, and gain insight to how applications are running. For example, the monitoring service 460 can allow system-wide visibility into application performance and operational health. Metrics generated by the health monitoring service 460 can be stored in the metrics database 462. It is this metrics database 462 that can store the network monitoring metrics 182 (FIG. 1) and 250 (FIG. 2). The health monitoring service 460 reviews metrics from all network devices in the compute service provider 400, rather than any particular source user network segment.

Figure 5:
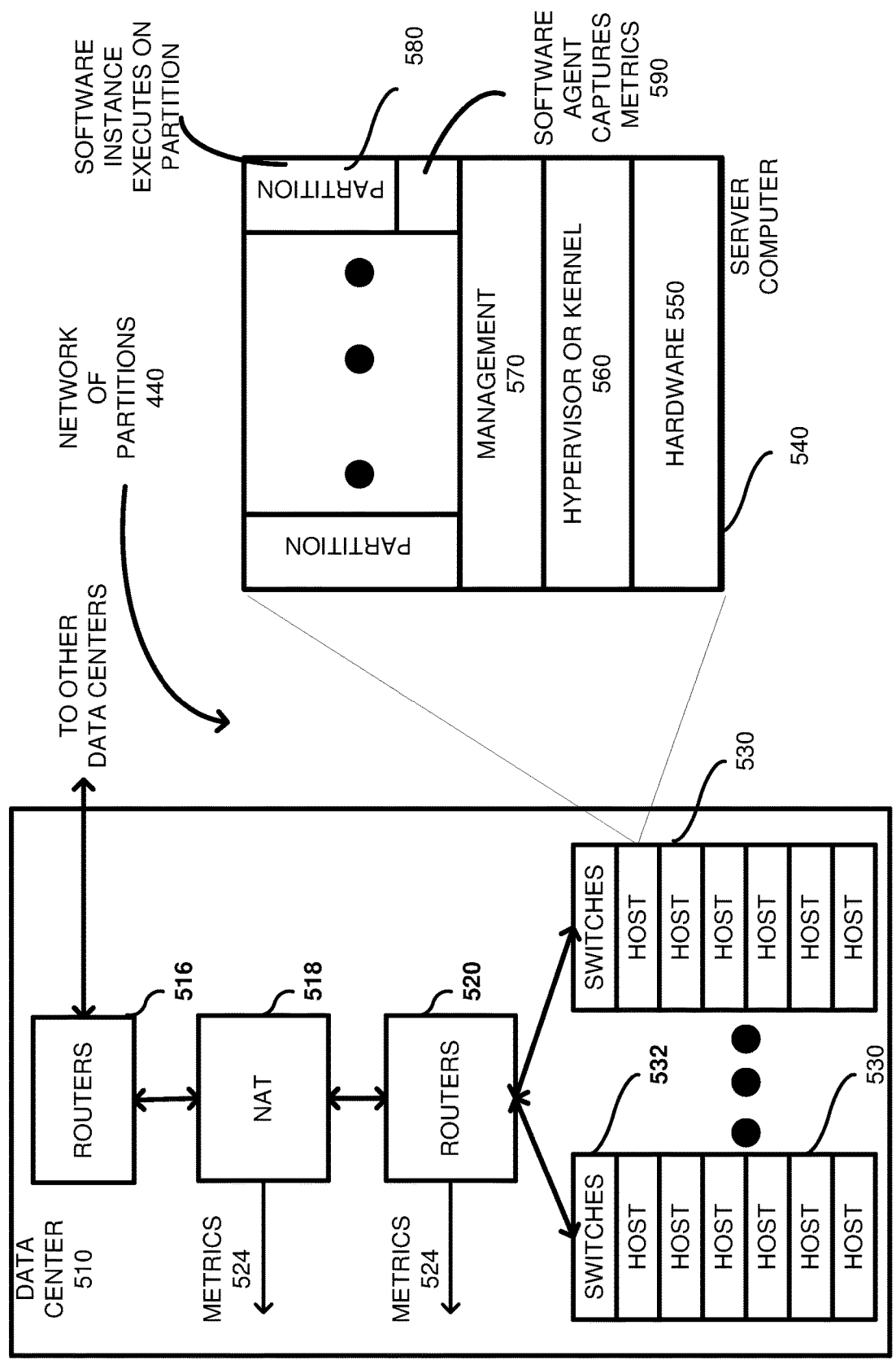
FIG. 5 shows an example of a plurality of host computers, routers and switches, which are hardware assets used for running virtual machine instances with local agents to capture metric data.

FIG. 5 illustrates the network of partitions 440 and the physical hardware associated therewith. The network of partitions 440 can include a plurality of data centers, such as data center 510, coupled together by routers 516. The routers 516 read address information in a received packet and determine the packet's destination. If the router decides that a different data center contains a host server computer, then the packet is forwarded to that data center. If the packet is addressed to a host in the data center 510, then it is passed to a network address translator (NAT) 518 that converts the packet's public IP address to a private IP address. The NAT also translates private addresses to public addresses that are bound outside of the datacenter 510. Additional routers 520 can be coupled to the NAT to route packets to one or more racks of host server computers 530. The routers and the NAT can transmit metrics (passive or active-based) 524 to the health monitoring service 460. Passive metrics can include counter data, which can be used to determine packet loss and latency. Each rack 530 can include a switch 532 coupled to multiple host server computers. A particular host server computer is shown in an expanded view at 540.

Each host 540 has underlying hardware 550 including one or more CPUs, memory, storage devices, etc. Running a layer above the hardware 550 is a hypervisor or kernel layer 560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The partitions 580 are logical units of isolation by the hypervisor. Each partition 580 can be allocated its own portion of the hardware layer's memory, CPU allocation, storage, etc. Additionally, each partition can execute its own virtual machine including a guest operating system. As such, each partition is an abstract portion of capacity designed to support its own virtual machine independent of the other partitions.

The virtual machine executing on a partition can include one or more applications and an operating system. Either the applications themselves or the operating system can include an agent 590, used to capture the log data. The log data can be passed by the agent through the management layer 570 to the health monitor 460 (FIG. 4). More specifically, some parameters of the virtual machines executing on the partitions can be monitored using the management layer 570, which can then pass the metrics to the health monitoring service 460 for storage in the metrics database 462. Additionally, the management layer 570 can pass to the health monitoring service 460, the number of instances that are running, when they were launched, the operating system being used, the applications being run, etc. All such metrics can be used for consumption by the health monitoring service 460.

Figure 6:
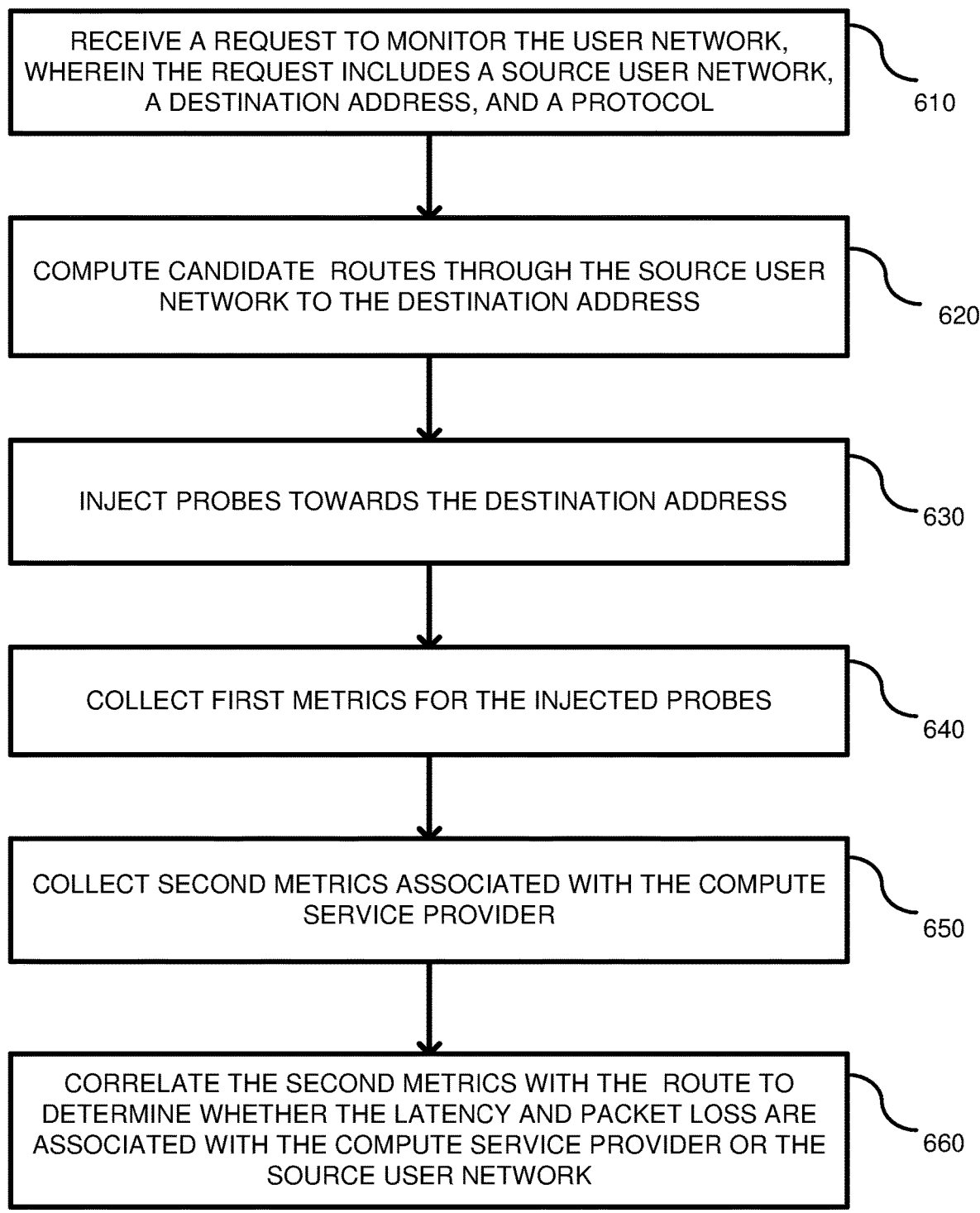
FIG. 6 is a flowchart of a method according to one embodiment for monitoring a network.

FIG. 6 is a flowchart according to one embodiment for monitoring a user network. In process block 610, a request is received to monitor the user network wherein the request includes an identifier of the source user network, a destination address and a protocol. For example, in FIG. 1, the request 122 can be received by the route analysis 150. The source user network can be the network segment 124 and the identifier can uniquely identify the network segment. The destination address can be an IP address of the endpoint 130 and the protocol can be the protocol for which probes are transmitted through the network. The protocol can be in conformance with the rules 140. In process block 620, a plurality of candidate routes is computed through the source user network to the destination address. Additionally, one of the candidate routes is used. One or more of the additional routes can be reserved as a failover. The routes can identify particular network devices through which test probes are to traverse in order to arrive from an injection point to the destination address. In process block 630, probes are injected towards the destination address. For example, returning to FIG. 1, the interface 160 can be coupled to the source user network segment 124 and probes 162 are injected through the interface by the probe injector 152. In process block 640, first metrics are collected for the injected probes. The metrics can include latency and packet loss data obtained by the probes being transmitted through the network segment 124 to the endpoint 130 as a ping message, with a response transmitted back to the probe injector 152. Other techniques for computing latency can be used. In process block 650, second metrics are collected associated with the compute service provider. For example, the network monitoring metrics 182 can relate to all network equipment in the compute service provider, not just devices within the source user network segment 124. Such metrics can be passively obtained (e.g., counters on routers) or actively obtained, such as by using agents on routers or servers (e.g., agent 590, FIG. 5). In process block 660, second metrics are correlated with the selected route to determine whether the latency and packet loss are associated with the compute service provider or the source user network. For example, the network monitoring metrics 182 are correlated with the candidate probe paths 180 for those metrics 172, which exceeded thresholds so as to determine if the metrics 172 that exceeded thresholds are being experienced by other users or is specific to the source user network segment 124.

Figure 7:
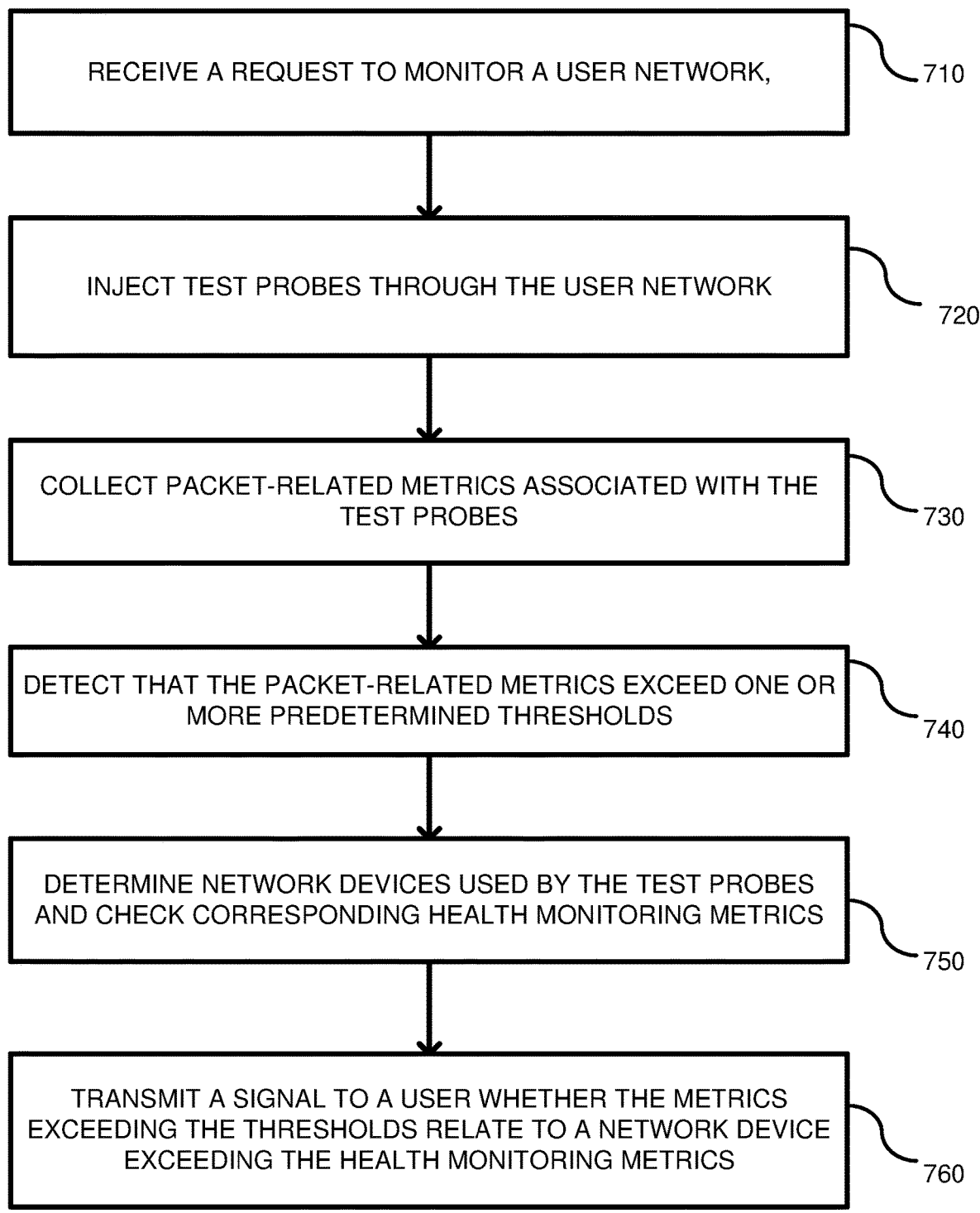
FIG. 7 is a flowchart according to another embodiment for monitoring a network.

FIG. 7 is a flowchart according to another embodiment for monitoring a user network. In process block 710, a request is received to monitor a user network. The request can be of the form of an API, such as is shown at 122 in FIG. 1. In process block 720, test probes are injected through the user network. For example, in response to the request, the probe injector 152 can inject probes 162 through the source user network segment 124 using an interface 160 established with the source user network segment 124. The test probes can be network packets transmitted in accordance with rules 140 of the source user network segment 124 and using a protocol identified in the request. In process block 730, packet-related metrics are collected associated with the packets. For example, in FIG. 1, the probe injector 152 can transmit the probes through the source user network segment 124 to the endpoint 130. In response, the endpoint 130 can re-transmit the probe network packets back to the probe injector 152. Based on a time of the return trip of the packets and based upon how many probes are dropped, the probe injector 152 can determine latency and packet loss metrics 172 and transmit such metrics for analysis by a metrics processor 170. In process block 740, packet-related metrics (e.g., latency and packet loss) are detected that exceed one or more predetermined thresholds. For example, the metrics processor 170 can compare the received metrics 172 to predetermined thresholds. For those metrics that exceed such thresholds, further analysis can be performed. In process block 750, network devices used by the test probes are determined and checked against corresponding health monitoring metrics. For example, the metrics processor 170 can use a database 180 to retrieve paths (and corresponding devices for those paths) that the probes took for metrics that were exceeded. In process block 760, a signal is transmitted to a user as to whether the metrics exceeding the thresholds (from process block 740) correspond to network devices that exceeded health monitoring metrics for other customers of the compute service provider. For example, the metric processor 170 can determine that devices within the source user network segment 124, which exceeded the predetermined thresholds, correspond with devices for which the health monitoring service 460 (FIG. 4) also found problematic for all users of the compute service provider, then the problem is under the control of the compute service provider. Thus, if other users experienced the same problems as the devices within the source user network segment, then the issue is likely with the compute service provider. On the other hand, if other users are not experiencing the issues, then the issue is likely with the user network segment. Additionally, services (e.g., FIG. 1 at 142) used by the source user network can be identified and analyzed to determine whether the services are causing the latency and packet loss associated with the metrics. In any event, the signal transmitted in process block 760 is indicative of whether the problem is with the compute service provider or not.

Figure 8:
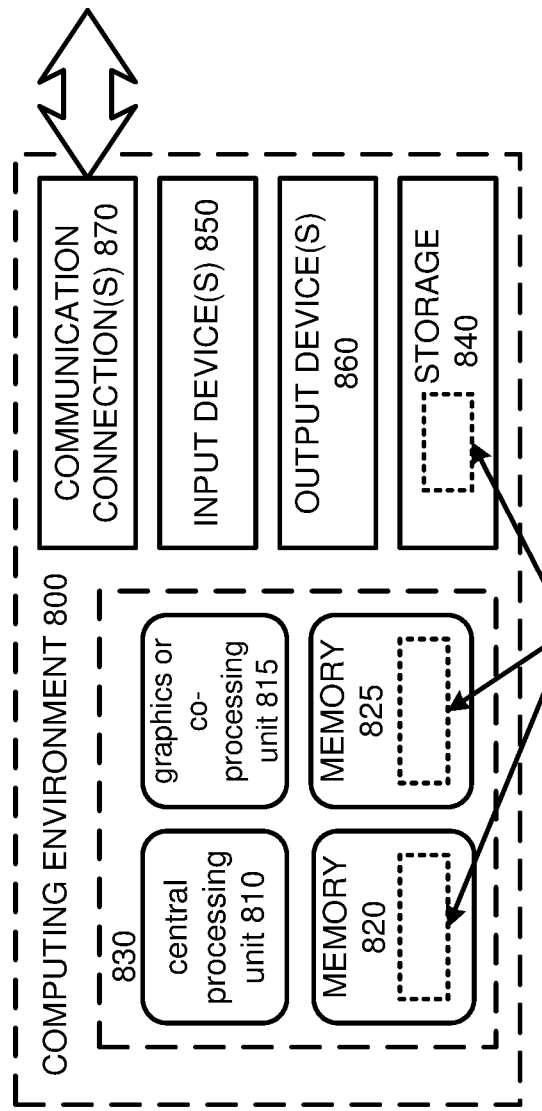
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, the software 880 can be executed on the central processing unit 810 in order to implement the functionality of the metric processor 170.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method, comprising:
    receiving a request to monitor a user network within a compute service provider;
    in response to the request, injecting test probes through the user network, wherein the test probes follow rules associated with the user network;
    collecting packet-related metrics associated with the test probes;
    detecting that the packet-related metrics exceed one or more predetermined thresholds;
    determining network devices used by the test probes and retrieving corresponding health monitoring metrics collected by the compute service provider for the determined network devices, wherein the determining of the network devices includes correlating network devices used by the test probes that followed the rules associated with the user network with network traffic of other users that traversed the network devices; and
    transmitting a signal to a user of the user network indicating whether the metrics exceeding the one or more predetermined thresholds relate to a network device within the user network that has also exceeded the health monitoring metrics.

2. The method of claim 1, wherein the request includes an identifier of the user network within the compute service provider, a destination address, and a protocol to be used by the test probes.

3. The method of claim 1, further including attaching an interface to the user network in order to transmit the test probes through the user network.

4. The method of claim 1, further including computing candidate routes through the user network to a destination address included in the request.

5. The method of claim 4, further including reserving one of the candidate routes as a failover route if the selected route fails.

6. The method of claim 1, further including detecting whether an edge networking device to which the user network is coupled is failing.

7. The method of claim 1, further including detecting whether a virtual networking interface to which the user network is coupled is failing.

8. The method of claim 1, further including analyzing multiple user segments associated with different users and determining that an interconnect coupled between the multiple user segments and the compute service provider is causing errors.

9. The method of claim 1, further including determining services used by the user network and determining whether the services are causing the latency and packet loss associated with the packet-related metrics.

10. One or more computer-readable media comprising computer-executable instructions that, when executed, cause a computing system to perform a method comprising:
- receive a request from a user to inject probes into a source user network segment within a compute service provider;
- compute routes through the source user network segment to a destination address included in the request;
- inject probes into the source user network, wherein the probes follow on one or more of the routes, and collect metrics associated with the probes, wherein the probes follow rules associated with the source user network;
- determine that the metrics associated with the probes exceed predetermined thresholds, and determine whether health monitoring metrics associated with network devices along the selected route by other users of the compute service provider exceed a threshold indicative of a problematic network device; and
- determine that the health monitoring metrics exceed the threshold, and alert the user that a problem is associated with the compute service provider.

11. The one or more computer-readable storage media according to claim 10, wherein the instructions, upon execution, further cause the computer system to:
- attach an interface to the source user network segment so that the probes follow rules of the source user network segment.

12. The one or more computer-readable storage media according to claim 10, wherein the instructions, upon execution, further cause the computer system to:
- identify services used by the source user network segment and determine whether the services are causing the metrics to exceed the predetermined thresholds.

13. The one or more computer-readable storage media according to claim 10, wherein the instructions, upon execution, further cause the computer system to:
- use one of the routes as a failover if the route being used fails.

14. The one or more computer-readable storage media according to claim 10, wherein the instructions, upon execution, further cause the computer system to:
- verify a routing policy of the user network.

15. The one or more computer-readable storage media according to claim 10, wherein the instructions, upon execution, further cause the computer system to:
- detect whether an edge networking device to which the source user network segment is coupled is failing by detecting whether other users coupled to the same edge networking device have also had similar metrics exceeding thresholds.

* * * * *